(No Model.)
F. A. REICHARDT.
COMBINED THERMOMETER CASE AND MAGNIFYING LENS.
No. 325,186. Patented Aug. 25, 1885.
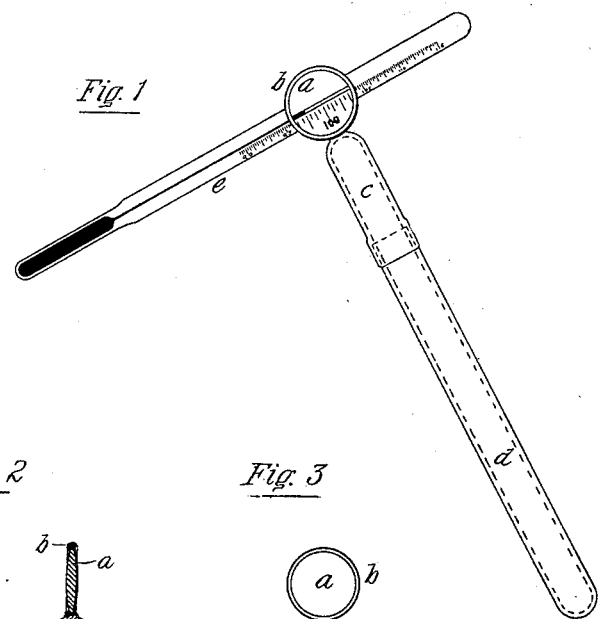

UNITED STATES PATENT OFFICE.

FERDINAND A. REICHARDT, OF ELIZABETH, NEW JERSEY.

COMBINED THERMOMETER-CASE AND MAGNIFYING-LENS.

SPECIFICATION forming part of Letters Patent No. 325,186, dated August 25, 1885.

Application filed February 10, 1885. (No model.)

*To all whom it may concern:*

Be it known that I, FERDINAND A. REICHARDT, a citizen of the United States, residing at Elizabeth, Union county, State of New Jersey, have invented a certain new and Improved Combined Case and Magnifying Lens, of which the following is a specification.

In a certain class of thermometers of delicate construction and sensitive in action, such as are used for clinical purposes, the column of mercury is so very small that it is difficult to make true and rapid readings; and the object of this invention is to provide a means for assisting the eye in reading the indications of the column of mercury in this class of instruments; and it consists in the application of a lens or magnifying glass to the case in which the thermometer is placed and protected when not in use, so that said magnifying-glass is always at hand when it is desired to use the thermometer, the case or part of the case to which the lens is attached constituting the handle of the lens. This magnifying-glass I prefer to secure in the end of the cover of the case.

In other words, my invention may be said to consist of a magnifying-glass having a hollow handle adapted to hold a thermometer or other instrument, in the use of either of which it is desirable to magnify the part of said instrument under examination. But to describe my invention more particularly I will now refer to the accompanying drawings, forming part of this specification, in which—

Figure 1 represents my improved instrument-holding case and magnifying-glass combined, showing the application of the same. Fig. 2 is a longitudinal section showing the instrument in the case. Fig. 3 is a view of the cover of the case and magnifying-glass, and Fig. 4 is a view of the body of the case.

The magnifying-glass or lens $a$ is held in the rim $b$, as shown in Fig. 2, which rim is secured to the end of the cover $c$ of the case. This cover $c$ may be attached to the body $d$ of the case by any suitable means, a screw-thread being shown in the drawings for this purpose. The case may be made of any suitable material, but I prefer metal, as it can be made lighter, stronger, and smaller with this material than with any other adapted for the purpose.

The case $c\ d$ constitutes a holding and protecting covering for the thermometer $e$, as well as a handle for the lens $a$, in using said lens to magnify the indications of the thermometer $e$, as shown in Fig. 1; or the cover only may be used as a handle for the lens, as shown in Fig. 3. It is evident that this hollow-handle of the magnifying-glass may be used to hold other instruments than thermometers; and it will be observed that the rim of the magnifying-glass will act as a stop to prevent the case from rolling when laid down, as said cases are preferably made cylindrical, this form being cheapest to make and best adapted for most purposes for which the hollow-handle magnifying-glass will be used; and it is evident that the lens may be secured to the body of the case by any suitable means instead of being secured to the cover.

I am aware that a thermometer case has been constructed having a lens inserted in the body thereof, but such is not my invention.

What I claim is—

A case for clinical thermometers, consisting of a tubular body and a cap adapted to cover the same, the latter having at its extremity a rim holding a magnifying-lens, substantially as described, and for the purposes set forth.

In testimony whereof I have hereunto set my hand, at New York, county and State of New York, this 7th day of February, 1885.

FERDINAND A. REICHARDT.

Witnesses:
  RICHARD KING,
  H. D. WILLIAMS.